March 11, 1958     W. W. THOMAS     2,826,216
FLUID METERING VALVE

Filed Sept. 14, 1951     3 Sheets-Sheet 1

INVENTOR
WILLIAM W. THOMAS,

BY    ATTORNEY

March 11, 1958 W. W. THOMAS 2,826,216
FLUID METERING VALVE
Filed Sept. 14, 1951 3 Sheets-Sheet 2

FIG. 2

INVENTOR
WILLIAM W. THOMAS,
BY *Roland C. Kehm*
ATTORNEY

March 11, 1958 W. W. THOMAS 2,826,216
FLUID METERING VALVE
Filed Sept. 14, 1951 3 Sheets-Sheet 3
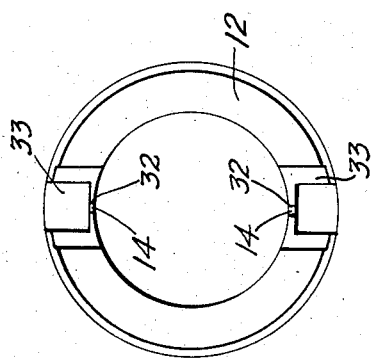
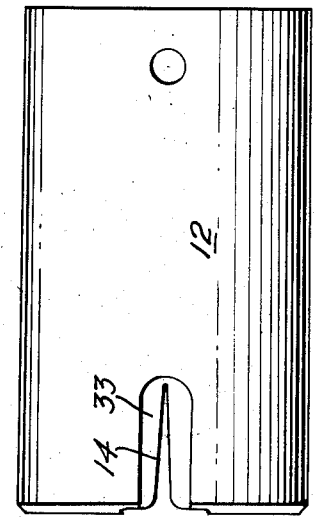
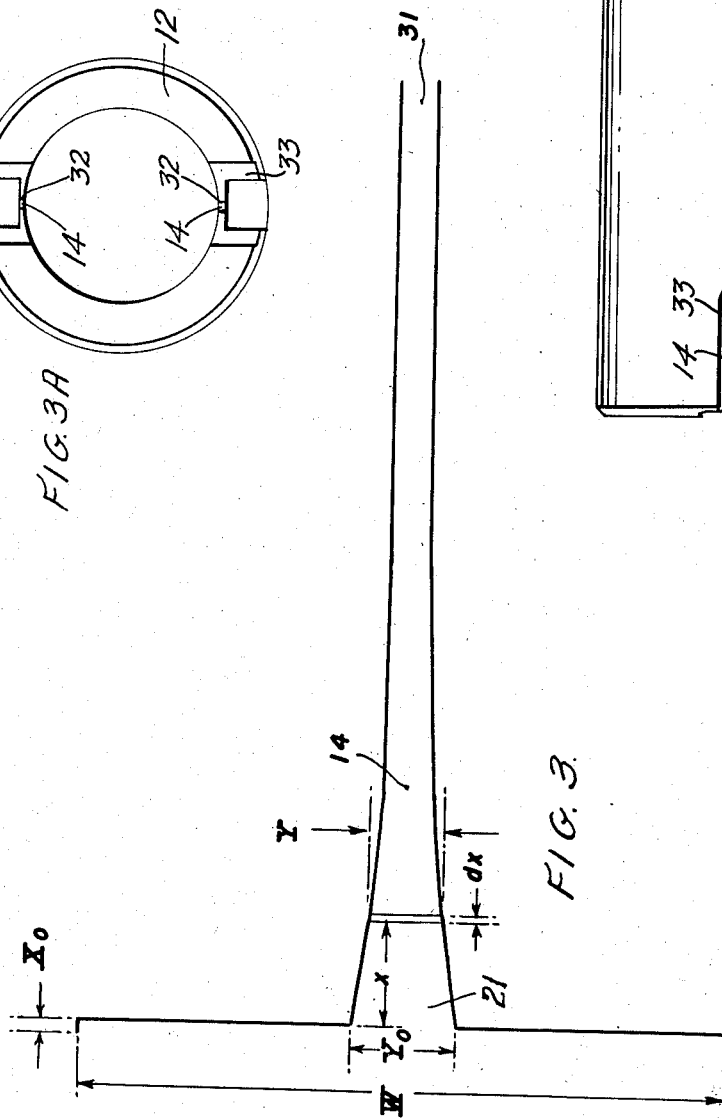
INVENTOR
WILLIAM W. THOMAS,
BY
ATTORNEY

United States Patent Office 2,826,216
Patented Mar. 11, 1958

2,826,216
FLUID METERING VALVE

William W. Thomas, Chicago, Ill., assignor to William Waterman, Evanston, Ill.

Application September 14, 1951, Serial No. 246,660

4 Claims. (Cl. 137—503)

This invention relates to a fluid metering valve or other device wherein the resistance to flow has a simple and preferably linear relation to the rate of flow.

The device operates to develop a pressure difference or drop between its up-stream and its down-stream ends which has a simple, and preferably linear, relation to the rate of flow. The device is characterized by a variable orifice by which it is possible to obtain any desired relation between the pressure drop and the rate of flow. Such relation is preferably simpler (e. g. linear) than that existing between the rate of flow and pressure drop for an orifice of fixed area wherein the pressure drop theoretically varies as the square of the rate of flow. A linear relationship makes it possible by simple means to indicate rate of flow or to utilize the rate of flow to effect control of other instrumentalities. For example, among other uses of the device, this makes it possible by means of a simple differential pressure gauge to indicate the rate of flow directly (in gallons per minute, for example) instead of merely the pressure drop in the device.

The nature of the invention and further objects and advantages thereof will readily appear from the following description of one illustrative embodiment of the invention shown in the accompanying drawings:

In said drawings:

Fig. 2 is a longitudinal sectional view of the illustrative metering valve;

Fig. 3 is a diagram on an enlarged scale illustrating the shape of an illustrative variable orifice;

Fig. 3A is an end view of the member carrying the variable orifice and showing the sharp-edge conformation of the orifice;

Fig. 3B is an elevation of the aforesaid member showing the shape of the variable orifice.

Figure 1:
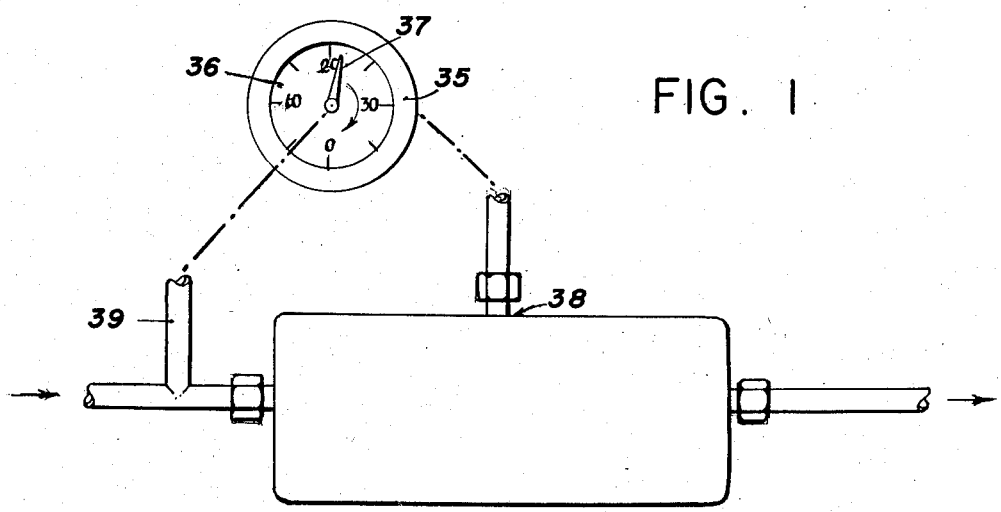
Figure 1 is a diagrammatic view illustrating the device connected with a differential gauge indicating rate of flow directly in gallons per minute.

Theoretically, the pressure drop in flow through an orifice or passage of fixed area, varies as the square of the rate of flow. This complex relationship makes it impossible by any simple means to utilize the pressure drop through such orifice or passage either to indicate rate of flow or exert any regulation responsive to the rate of flow. In the illustrative device the aforesaid relationship may be altered and simplified by means of an orifice whose area varies with the rate of flow so as to produce a pressure drop having a simple relation to the rate of flow and preferably a direct linear relation thereto.

In the illustrative device the valve member in the form of a piston 10 is displaced by the differential between up-stream and down-stream pressure against the resistance of a standard helical spring 11 whose deflection varies (according to Hookes' law) in proportion to the load on it. As here shown valve piston 10 has a close sliding fit in the cylinder or sleeve 12 and controls the flow of fluid from inlet 13 through one or more orifices 14. In its extended position as shown in Fig. 2 (wherein no differential of pressure exists between the up-stream and down-stream sides of the piston), the latter completely covers and closes orifices 14. From the orifices 14, flow travels through the annular passage 15 between the valve housing 16 and cylinder 12. Beyond the end of the cylinder flow passes through ports 17 into outlet 18. The down-stream pressure in passage 15 is communicated to the rear face of the valve piston 10 through one or more openings 19 in the cylinder. The piston valve is thus responsive to the pressure drop or difference between the up-stream and down-stream sides of orifices 14.

The spring having a linear rate of deflection, for each unit of change in pressure drop, the piston moves a unit amount. In other words for each one pound force on the valve piston, the spring with the piston will deflect equal amounts. The effective area of orifices 14 is thus altered by each movement of the valve piston.

The shape or outline of orifice 14 thus determines the relation between the pressure drop and the rate of flow. In the illustrative orifice (see Figs. 3, 3A and 3B) it is shaped and designed to produce a pressure drop having a direct linear relation to the rate of flow, that is the pressure drop is directly proportional to the rate of flow. The wide portion 21 of the orifice is located adjacent the up-stream end of cylinder 12, and the orifice narrows down so that the increase in the effective area of the orifice (effected by progressive uncovering of the orifice by piston 10) varies with the linear movement of the piston in such manner as to produce the desired pressure drop.

It should be understood that orifices may be designed as hereinafter explained to provide a variety of relations between flow and pressure drop. However, the linear relation embodied in the illustrative valve seems to be the most useful.

The following is one procedure for designing an orifice or orifices to provide a given relationship between flow and pressure drop:

The most general linear variation is $$Q = k_1 p + k_0 \qquad (1)$$

where:

$Q$ is the discharge
$p$ is the pressure drop across the valve
$k_0, k_1$ are constants The valve must have a variable orifice area that is a function of the pressure difference. One form is a spring-backed piston with a displacement varying linearly with the pressure difference. The most general linear relation is $$p = k_2 x + k_3 \qquad (2)$$

where:

$x$ is the displacement of the piston
$k_2, k_3$ are constants

The equation for discharge through an orifice, neglecting velocity of approach correction, usually takes the form:

$$Q = C_D A \sqrt{2gH} \qquad (3)$$

where:

$A$ is the orifice area
$H$ is the pressure difference on the two sides of the orifice expressed in equivalent column of fluid flowing
$C_D$ is the discharge coefficient
$g$ is the acceleration due to gravity All quantities must of course be expressed in consistent units, such as $Q$ in cubic feet per second, $A$ in square feet, H in feet, and $g$ in feet per second. $C_D$ is dimensionless. The coefficient varies slightly with Reynolds number and the changes in orifice shape. These variations may be neglected.

Expressing H as $p/w$ where $w$ is the specific weight of liquid and inserting in Eq. 3

$$Q = \frac{C_D\sqrt{2g}}{\sqrt{w}} A\sqrt{p} = KA\sqrt{p} \qquad (4)$$

Eliminating Q in Eqs. 1 and 4 and rearranging $$(k_1 p + k_0) p^{-1/2} = KA \qquad (5)$$

Differentiating $$(k_1 p + k_0)(-1/2) p^{-3/2} dp + k_1 p^{-1/2} dp = K dA \qquad (6)$$

Referring to Fig. 3, an increment of area $dA$ is given by $$dA = y\, dx \qquad (7)$$

Differentiating Eq. 2

$$dp = k_2 dx \qquad (8)$$

Eliminating $p$, $dp$ and dividing through by $dx$, using Eqs. 2, 6, 7, and 8

$$y = \frac{k_1 k_2}{K\sqrt{k_2 x + k_3}} \left[ 1 - \frac{k_2 x + k_3 + k_0/k_1}{2(k_2 x + k_3)} \right] \qquad (9)$$

Equation 9 provides the algebraic relation between $x$ and $y$ for design of the orifice. When $x=0$, $y$ becomes indefinitely large; hence, the equation is applied for values of $x > x_0$, where $x_0$ is the piston displacement at which the linear relation given by Eq. 1 starts to hold. Selecting the initial conditions $x=x_0$, $A=A_0$, $p=p_0$, the discharge $Q=Q_0$ is computed from Eq. 4 and $y=y_0$ from Eq. 9. The shape of $A_0$ is unimportant.

In order to be logical, the value of $y$ in Eq. 9 must be positive. In other words, A must increase with $p$. To insure this $dQ/dp = k_1$ from Eq. 1 must be greater than $dQ/dp$ for constant A in Eq. 4, $$k_1 \geq \frac{KA}{2\sqrt{p}} = \frac{Q}{2p} = \frac{k_1}{2} + \frac{k_0}{2p}$$

or $$k_1 \geq \frac{k_0}{p} \qquad (10)$$

for all values of $p$ in the control range.

In designing a valve the constants $k_1$ and $k_2$ may be selected as desired. $k_1$ is the increase in discharge per unit change in pressure drop; $k_2$ is the increase in pressure drop for unit displacement of the piston. The initial area $A_0$ is given by Eq. 4

$$A_0 = \frac{Q_0}{K\sqrt{P_0}} \qquad (11)$$

The base line from which $x$ is measured is arbitrary, as well as the shape of the area $A_0$; hence, $x_0$ is arbitrary. Solving for $k_0$, $k_3$ from Eqs. 1 and 2 using initial conditions $$k_0 = Q_0 - k_1 p_0 \qquad (12)$$

$$k_3 = p_0 - k_2 x_0 \qquad (13)$$

The distance $y_0$ can now be computed from Eq. 9 for $x = x_0$. With the constants all determined, $y$ is determined for a series of values of $x$ in Eq. 9.

The above derivation is for one orifice. If two or more orifices are desired, the discharge is proportionately increased.

Using a non-consistant but customary set of units:

$x$, $y$ in inches
A in inches$^2$
$p$ in p. s. i.
Q in g. p. m.
$w$ in lbs./ft.$^3$ the constant K in Eq. 4 is $$K = \frac{C_D\sqrt{2g}}{\sqrt{w}} \frac{60 \times 7.46}{12} \qquad (14)$$

For the particular case where $K_0 = 0$, Eq. 9 reduces to $$y = \frac{k_1 k_2}{2K\sqrt{k_2 x + k_3}} \qquad (15)$$

and for the special case where $k_0 = k_3 = 0$, $$y = \frac{k_1\sqrt{k_2}}{2K\sqrt{x}} \qquad (16)$$

which is the particular solution for the illustrative metering valve.

It is obvious that the general procedures used herein can be extended to non-linear relations between Q, $p$, and $x$.

The following illustrates the design of a valve having two orifices 14 and having a discharge of 0.2 G. P. M. at 2 p. s. i. and 4.2 G. P. M. at 50 p. s. i. pressure difference with the discharge varying linearly with pressure between the two values; the maximum displacement of piston is 0.50 in. and there is to be no discharge whatever for pressure drops below 1 p. s. i.; and the fluid is oil, sp. wt. 55 lbs./ft.$^3$, and the discharge coefficient is $C_D = 0.65$:

*Solution.*—One orifice will discharge 0.1 G. P. M. at 2 p. s. i. and 2.1 G. P. M. at 50 p. s. i. For one orifice, using Eq. 1

$$0.1 = 2k_1 + k_0$$
$$2.1 = 50k_1 + k_0$$

Solving simultaneously, $k_1 = 1/24$, $k_0 = 0.0167$.

Using Eq. 2 and letting $x$ be displacement of the piston from the closed position:

$$x = 0, \quad p = 1$$
$$x = 0.50, \quad p = 50$$

hence $$k_3 = 1$$
$$k_2 = 98$$

From Eq. 14

$$K = \frac{.65 \times 8.02 \times 60 \times 7.46}{\sqrt{55} \times 12} = 26.21$$

Substituting into Eq. 9

$$y = \frac{0.1556}{\sqrt{98x+1}} \left( 1 - \frac{49x + 0.7}{98x + 1} \right)$$

From Eq. 11

$$A_0 = \frac{0.1}{26.21\sqrt{2}} = 0.0027 \text{ in.}^2$$

As $P_0 = 2$ p. s. i., from Eq. 2

$$x_0 = \frac{P_0 - k_3}{k_2} = 0.0102 \text{ in.}$$

The width, $w$, of the rectangular opening between $x = 0$ and $x = x_0$ is $$W = \frac{0.0027}{0.0102} = 0.2645 \text{ in.}$$

The width of the opening at $x = x_0$ is $y_0 = 0.0375$ in. Solving for $y$ for representative values of $x$ (see Fig. 3):

| $x$ Inches | $y$ Inches |
|---|---|
| 0.0102 | 0.0375 |
| 0.05 | 0.0298 |
| 0.10 | 0.0227 |
| 0.20 | 0.0168 |
| 0.30 | 0.0139 |
| 0.40 | 0.0121 |
| 0.50 | 0.0109 |

The general equation for a control valve that yields a linear relationship between the discharge and pressure drop and having a spring backed piston with a displacement varying linearly with the pressure difference, is:

$$y = \frac{k_1 k_2}{K\sqrt{k_2 x + k_3}} \left[ 1 - \frac{k_2 x + k_3 + k_0/k_1}{2(k_2 x + k_3)} \right]$$

The particular solution for the illustrative valve is:

$$y = \frac{k_1 \sqrt{k_2}}{2K\sqrt{x}}$$

where $y$ is the width of the slot, in. (see Fig. 3)
$x$ is the slot opening, in. (see Fig. 3)
$k_1$ is the increase in discharge per unit change in pressure drop, G. P. M./p. s. i.
$k_2$ is the increase in pressure drop per unit displacement of the piston, p. s. i./inch $$K \text{ is } \frac{C_D \sqrt{2g}}{\sqrt{w}} \frac{60 \times 7.46}{12}$$

where $w$ is lb./ft.$^3$
$g$ is acceleration due to gravity in ft./sec.$^2$
$C_D$ is a dimensionless coefficient The physical requirements for each valve determine the piston area, orifice area and spring rate, but the general formula remains unchanged.

Preferably the cylinder 12 is in the form of a removable sleeve so that a single design may be adapted for different flow rates and different ratios of flow rate to pressure drop, merely by substituting a cylinder carrying a different orifice, and if necessary by substituting another spring 11. Limited changes may of course be made merely by a change in the spring. In the present case cylinder 12 is seated at one end in a circular recess 22 in the head 23 of the housing. Its other end seats against the shoulder 24 which in the present case is provided by the sleeve 25 carrying the ports 17. The latter sleeve is seated in a circular recess 26 in the removable head 27 which in the present case is in the form of a threaded fitting carrying outlet 18 and adapted to be connected with a fluid line. The inlet side of the housing head 23 is provided with a fitting 28 for connection of a line with inlet 13.

The orifice is preferably made sharp edged to reduce the sensitivity of the device to variations in viscosity of the fluid. A sharp edged orifice may be made either by using a very thin shell or cylinder 12 or by making the inside edge 32 of the orifice very sharp and then flaring back or enlarging the space downstream of the orifice as indicated at 33 throughout the perimeter of the orifice. (See Figs. 2, 3A and 3B.)

For relatively light fluids such as gasoline variations in viscosity are relatively low.

Figure 4:
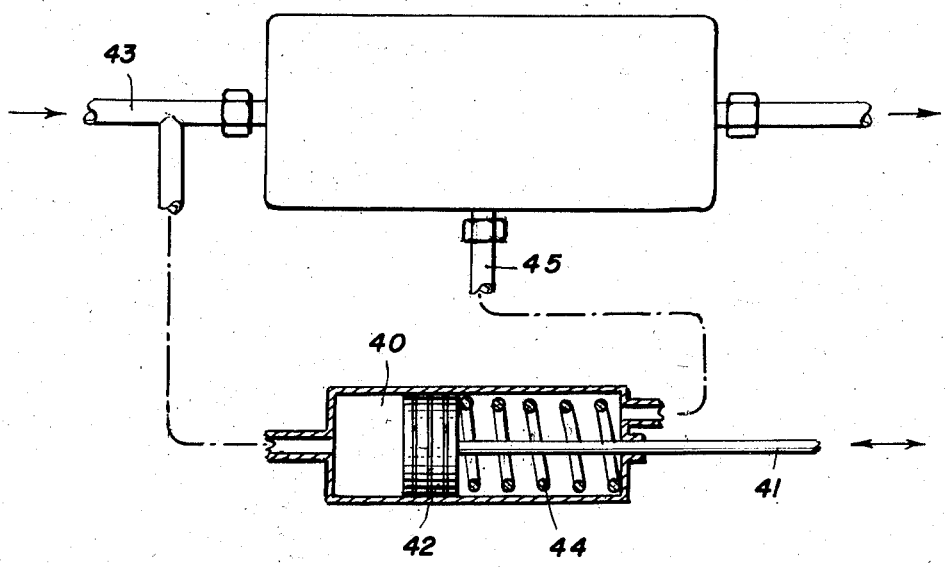
Fig. 4 is another diagram illustrating the metering valve connected with a controlling device responsive to the pressure drop and movable directly proportionately with the rate of flow.

Figs. 1 and 4 illustrate diagrammatically some of the uses for a metering valve of this character. In Fig. 1 the up-stream and down-stream ends of the device are connected to a differential gauge 35 similar to a pressure gauge wherein the movement of the gauge elements is directly proportional to variations of pressure. One form of gauge may embody two Bourdon tubes controlling respectively a movable dial 36 and a movable pointer 37. The pointer is connected with the downstream side of the valve, in this case at the port 38 in the housing 16 and is therefore responsive to the pressure downstream of orifices 14. The Bourdon tube controlling the dial is connected with the up-stream side of the device as at 39 and thereby is made responsive to the pressure at the up-stream face of piston 10. Both the dial and the pointer are designed to rotate in the same direction, in this case clockwise. Preferably the dial is graduated to indicate rate of flow, in the present instance, in gallons per minute. For zero flow (zero pressure drop) the pointer is adjusted to register with the zero reading on the dial. Thereafter the relative positions of the dial and pointer correspond to the pressure drop and therefore the pointer indicates the rate of flow in gallons per minute.

In Fig. 4 the illustrative fluid metering valve is illustrated diagrammatically as being connected with an actuating device 40 responsive to and moving directly proportionally to variations in pressure drop. The device is here shown in the form of a piston rod 41 and piston 42 exposed to up-stream pressure from line 43 (connected to the up-stream side of the fluid metering valve). Movement is resisted by helical spring 44 whose deflection is proportional to the load upon it. The opposite face of piston 42 is exposed to down-stream pressure in the fluid metering valve through line 45. Hence the piston rod 41 is movable directly proportionally to variations in the pressure drop. If desired the same result could be obtained by connecting a piston rod similar to rod 41, directly to piston 10 (and thereby dispensing with the added control device 40) since movement of piston 10 is also proportional to variations in pressure drop. An arrangement of the foregoing character may be employed to control one instrumentality proportionally to the rate of fluid flow in another instrumentality. For example the flow of fuel, e. g., gasoline through the fluid metering valve may be used to control another instrumentality responsively to the rate of flow of fuel. Also in a jet engine the rate of flow of a fraction of the air flow through the fluid metering valve may be used to control the rate of supply of fuel.

It will be understood that the fluid metering valve is not limited to any particular use but is adapted to various uses connected with rate of flow. Obviously the invention is not limited to the details of the illustrative device as these may be variously modified. Moreover it is not indispensable that all features of the invention be used conjointly since various features may be used to advantage in different combinations and sub-combinations.

Having described my invention, I claim:

1. A fluid flow responsive device comprising in combination a housing having a fluid inlet and outlet, a cylinder forming a portion of the fluid passage between said inlet and outlet, a piston valve slidable in said cylinder and exposed to the pressure drop between inlet and outlet, an orifice in the cylinder wall to pass the flow from inlet to outlet, said orifice being elongated in the direction of valve travel and being progressively uncovered by opening movement of said valve, a spring resisting movement of said valve and designed to deflect in direct proportion to said pressure drop whereby the opening movement of said valve is directly proportional to said pressure drop, said orifice progressively narrowing in the direction of opening valve movement to limit flow through said orifice to an amount directly proportional to the movement of said piston valve.

2. A fluid actuated flow responsive device comprising in combination a housing having a fluid inlet and outlet and a cylindrical valve chamber having an orifice through which flow from inlet to outlet passes, a piston valve in said cylinder and exposed to the pressure drop through said orifice, said orifice being continuous and elongated in the direction of movement of said piston valve, said piston valve in its closed position covering said orifice and progressively uncovering the same on its opening movement responsively to pressure drop in said device, a spring resisting movement of said piston valve and designed to deflect in direct proportion to said pressure drop whereby the extent of opening movement of said piston valve is directly proportional to said pressure drop, said orifice progressively narrowing in width in the direction of opening piston movement at a rate to expose an effective orifice to pass fluid flow in linear proportion to the movement of said piston valve.

3. A fluid actuated valve device comprising in combination a housing having a fluid inlet and outlet, a cylinder forming a portion of the passage between inlet and outlet and having an orifice therein elongated in the direction of the cylinder axis and serving to pass flow from inlet to outlet, a piston valve slidable in said cylinder and progressively uncovering and covering said orifice during opening and closing sliding movement of said piston valve, said piston valve being responsive to the pressure drop between inlet and outlet and moveable thereby in a direction to uncover said orifice, a spring resisting said movement and designed to deflect in direct proportion to said pressure drop whereby the opening movement of said piston valve is directly proportional to said pressure drop, said orifice progressively narrowing in the direction of opening movement of said piston valve to vary the rate of fluid flow and limit the same in linear proportion to the movement of said piston valve.

4. A fluid valve device comprising in combination a valve housing having inlet and outlet, a cylinder inside of and of smaller diameter than the internal diameter of said housing to provide an annular fluid passage connected to said outlet, said cylinder having an orifice extending longitudinally thereof, a piston valve longitudinally sliding in said cylinder and controlling the extent of opening of said orifice, and of a length completely to cover said orifice when the valve is in closed position, said inlet leading to one end of said cylinder to expose said piston valve to flow entering said housing, said outlet leading from said orifice whereby said piston valve is subjected to the pressure difference between that in said inlet and that in said outlet, a spring resisting movement of said piston valve in response to said pressure difference, said spring being designed to deflect and permit the piston valve to move in linear proportion to said pressure difference, said orifice being in the form of a continuous slot extending longitudinally of said cylinder and progressively narrowing in width in the direction of opening movement of said piston valve to limit flow through the portion thereof opened by said piston valve to an amount in linear proportion to the extent of movement of said piston valve.

References Cited in the file of this patent

UNITED STATES PATENTS

| | | |
|---|---|---|
| 306,208 | Ashton et al. | Oct. 7, 1884 |
| 318,748 | Kays | May 26, 1885 |
| 1,150,743 | Butts | Aug. 17, 1915 |
| 1,205,787 | Rosencrants | Nov. 21, 1916 |
| 1,215,669 | Liese | Feb. 13, 1917 |
| 1,580,678 | Roucka | Apr. 13, 1926 |
| 2,011,333 | Clifton | Aug. 13, 1935 |
| 2,293,988 | Krueger | Aug. 25, 1942 |
| 2,305,519 | Dunmire | Dec. 15, 1942 |
| 2,308,583 | Berges | Jan. 19, 1943 |
| 2,329,142 | Shank | Sept. 7, 1943 |
| 2,400,479 | Binford | May 21, 1946 |

FOREIGN PATENTS

| | | |
|---|---|---|
| 366,022 | France | July 13, 1906 |